Figure 1:
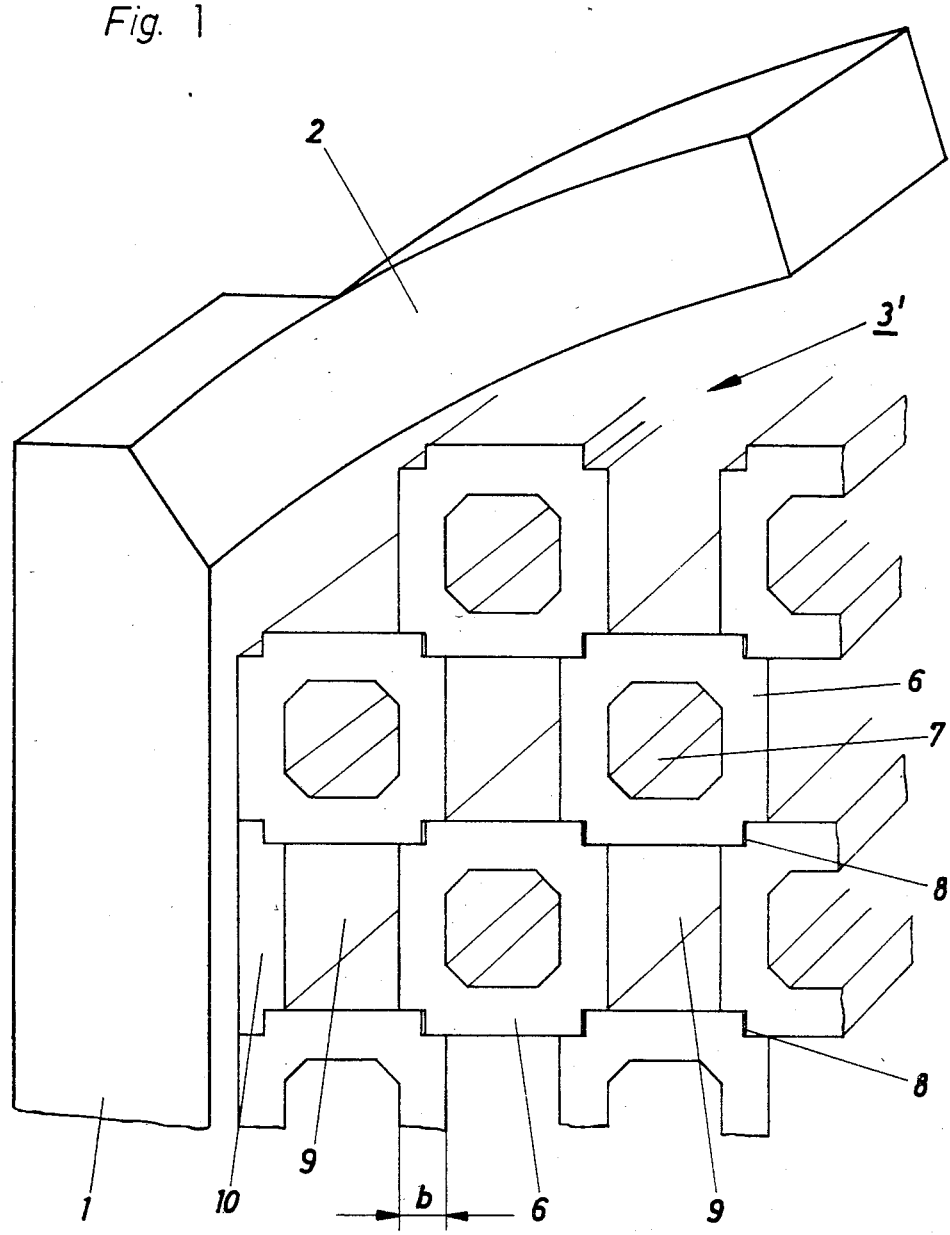

United States Patent [19]

Horak et al.

[11] Patent Number: 4,589,474
[45] Date of Patent: May 20, 1986

[54] CHECKERWORK IN HORIZONTAL CHAMBER OF A REGENERATIVELY FIRED FURNACE

[75] Inventors: Josef Horak, Vienna; Friedrich Kassegger, Wiener Neustadt, both of Austria

[73] Assignee: Veitscher Magnesitwerke-Actien-Gesellschaft, Vienna, Austria

[21] Appl. No.: 540,899

[22] Filed: Oct. 11, 1983

[30] Foreign Application Priority Data

Oct. 25, 1982 [AT] Austria ................................ 3919/82

[51] Int. Cl.⁴ .............................................. F28D 17/02
[52] U.S. Cl. ...................................... 165/9.1; 165/9.2; 165/9.4
[58] Field of Search ..................... 165/9.1, 9.2, 9.3, 9.4

[56] References Cited

U.S. PATENT DOCUMENTS 1,978,191 10/1934 Forter .................... 165/9.2
4,282,923 8/1981 Cheetham ............. 165/9.1

FOREIGN PATENT DOCUMENTS 389284 1/1924 Fed. Rep. of Germany ....... 165/9.2
3038701 4/1982 Fed. Rep. of Germany ....... 165/9.1
871219 4/1942 France ................................. 165/9.1
36809 10/1911 Sweden .............................. 165/9.1
685789 1/1953 United Kingdom ................ 165/9.2

Primary Examiner—Albert W. Davis, Jr.
Attorney, Agent, or Firm—Kurt Kelman

[57] ABSTRACT

A checkerwork in a horizontal regenerator chamber of a regeneratively fired furnace, comprising an array of horizontally and vertically adjacent hollow prismatic bricks of refractory material, the bricks being arrayed in horizontal and vertical rows, and each brick having a horizontally extending longitudinal axis, a rectangular periphery and an axially extending bore of a rectangular cross section.

3 Claims, 1 Drawing Figure

CHECKERWORK IN HORIZONTAL CHAMBER OF A REGENERATIVELY FIRED FURNACE

The present invention relates to a checkerwork in a horizontal regenerator chamber of a regeneratively fired furnace, particularly glass melting furnaces, comprising an array of bricks of refractory material.

As is well known, regeneratively fired furnaces, such as glass melting furnaces, comprise a trough-shaped tank holding molten raw material, such as a glass-making batch, which is supplied with heat by the oxidation of fuel and preheated air. The fuel enters through ports wherein burners are mounted while the preheated air is alternatively drawn through regeneration chambers each of which holds a respective checkerwork of refractory bricks. In operation, the checkerworks are first heated by exhaust gas escaping through them. Thereafter, the checkerworks are cooled while transferring their heat to the combustion air being drawn through them. Air is supplied to the regeneration chamber being cooled through a canal leading to the chamber while the opposite regeneration chamber, which is simultaneously being heated, is exhausted through its corresponding canal. The checkerworks are positioned above the canals and their bricks define channels through which the fresh air and the exhaust gas, respectively, flow. The heat transfer between the checkerwork bricks and the fresh air and exhaust gas, respectively, takes place along the brick walls defining these channels.

In many regeneratively-fired furnaces, the checkerwork bricks are mounted in the regenerator chambers so that their longitudinal axes extend vertically, i.e. the gas flows through the channels in a vertical direction. Bricks and checkerworks of this type are known, for example, from U.S. patent application Ser. No. 346,225, filed Feb. 5, 1982, now U.S. Pat. No. 4,436,144, granted Mar. 13, 1984, and have been used with considerable success since their configuration permits the construction of stable checkerworks in the regeneration chambers of glass melting furnaces while the wall thickness of the bricks has been reduced so that practically the entire brick volume may be used to store the heat. The hollow prismatic bricks of refractory material disclosed in this patent have an octogonal periphery and a through bore of square cross section whose corners may be rounded or beveled.

However, it has also been proposed to provide the regeneration chambers of regeneratively fired furnaces with checkerworks whose bricks are horizontally arrayed, i.e. whose longitudinal axes extend horizontally, so that gas flows through their through bores in a horizontal direction. Hollow prismatic bricks with an octogonal periphery cannot be used in such checkerworks since the oblique contact faces between adjacent bricks would cause horizontal displacements which could be prevented only by the provision of strong anchoring elements and this, in turn, may lead to breakage of the bricks.

It is the primary object of this invention to provide a checkerwork in a horizontal regenerator chamber of a regeneratively fired furnace, which permits a stable construction of the checkerwork while maintaining a reduced thickness of the checkerwork brick walls defining the gas flow channels so that the heat storage capacity of the bricks is used optimally and the width of the flow channels may be readily adapted to operational requirements.

The above and other objects are accomplished according to the invention with an array of horizontally and vertically adjacent hollow prismatic bricks of refractory material, the bricks being arrayed in horizontal and vertical rows, and each brick having a horizontally extending longitudinal axis, a rectangular periphery and an axially extending bore of rectangular cross section. The periphery and the cross section of the bore are preferably square.

The above and other objects, advantages and features of the present invention will become more apparent from the following detailed description of certain now preferred embodiments thereof, taken in conjunction with the accompanying, some what schematic drawing wherein FIG. 1 is a fragmentary perspective view of a horizontal regenerator chamber of a regeneratively fired furnace, showing the checkerwork according to this invention.

The horizontal regenerator chamber is defined by partially illustrated ceiling wall 2. As shown in the drawing, checkerwork 3' comprises an array of horizontally and vertically adjacent hollow prismatic bricks 6 of refractory material. The bricks are arrayed in horizontal and vertical rows. Each brick has a horizontally extending longitudinal axis, a rectangular periphery and an axially extending bore of rectangular cross section. The square periphery of each brick 6 defines stepped recess 8 extending substantially parallel to the longitudinal axis along each corner of the brick periphery, and adjacent ones of recesses 8 in adjacent bricks 6 engage each other. Bore 7 of each brick has beveled corners extending substantially parallel to the longitudinal axis. The rounded or beveled corners of the brick bores increase the stability of the hollow bricks and also facilitate their manufacture. Furthermore, these rounded or beveled corners in the gas flow channels may be used to cause turbulence in the gas flow, thus enhancing the heat transfer between the gas and bricks. For example, successive bricks in the direction of the gas flow may alternately be provided with bores with and without such rounded or beveled corners whereby projecting portions are produced in the gas flow channels to create zones of gas turbulence.

Adjacent hollow bricks 6 are spaced from each other in horizontal and vertical rows whereby each group of four horizontally and vertically adjacent bricks defines not only four bores 7 but an additional gas flow channel 9 which is of rectangular cross section while bores 7 are of substantially square cross section, modified by beveled corners to produce an octagon. The gas flow channels of the checkerwork form a checkerboard pattern.

Checkerboard 3' further comprises edge bricks 10 in every other horizontal row. The hollow bricks 6 and edge bricks 10 form heated walls defining bores 7 and additional gas flow channels 9. Each edge brick has substantially the same shape and thickness b of a wall of the arrayed bricks 6.

As has been described and illustrated in the above-identified patent, the bore of each hollow brick may have the form of a frustum of a pyramid whereby the wall thickness differs at the opposite ends of the brick. As is also known, the walls of the bricks may define recesses or openings. These features will enhance turbulence in the gas flow.

Bricks 6 may have bores 7 of square cross section with sides of a length of about 100 to 160 mm defined by walls of a thickness b of about 40 mm. With such bricks, additional channels 9 of rectangular cross section will have a width of about 100 to 160 mm and a length of about 140 to 200 mm.

What is claimed is:

1. A checkerwork in a horizontal regenerator chamber of a regeneratively fired furnace, comprising an array of horizontally and vertically adjacent hollow prismatic bricks or refractory material, each brick having a horizontally extending longitudinal axis, a rectangular periphery and an axially extending bore of rectangular cross section, the rectangular periphery of each brick defining a stepped recess extending substantially parallel to the longitudinal axis along each corner of the brick periphery, adjacent ones of the recesses in adjacent ones of the bricks engaging each other, the bore and periphery being defined by walls alternately absorbing heat from exhaust gas escaping from the furnace through the bore and transferring the heat to combustion air drawn therethrough, and the bricks being so spaced and arrayed in horizontal and vertical rows that each group of four horizontally and vertically adjacent bricks defineds not only four of said bores but an additional gas flow channel of rectangular cross section, vertical ones of said brick walls between the bores and gas flow channels being in vertical alignment whereby all vertical pressure forces exerted by an upper one of the horizontal rows of bricks upon a lower one of the rows are absorbed exclusively by the vertical brick walls while the bores and gas flow channels are free of pressure.

2. The checkerwork of claim 1, further comprising edge bricks of refractory material in every other horizontal row, the hollow and edge bricks forming heated walls defining the bores and additional gas flow channels, each edge brick having substantially the shape and thickness of a wall of the arrayed bricks.

3. The checkerwork of claim 1, wherein the bore of each brick has beveled corners extending substantially parallel to the longitudinal axis.

* * * * *